United States Patent [19]

Kachi et al.

[11] Patent Number: 5,245,612
[45] Date of Patent: Sep. 14, 1993

[54] SPREAD PACKET COMMUNICATION SYSTEM

[75] Inventors: Seiji Kachi; Susumu Otani; Motoya Iwasaki; Shoji Endo; Shinichi Kono, all of Tokyo, Japan

[73] Assignee: NEC Corporation, Japan

[21] Appl. No.: 643,793

[22] Filed: Jan. 22, 1991

[51] Int. Cl.[5] .............................. H04J 3/06
[52] U.S. Cl. .................. 370/104.1; 370/105.4; 370/108; 375/115
[58] Field of Search ............... 370/104.1, 100.1, 105.4, 370/108; 375/1, 115

[56] References Cited

U.S. PATENT DOCUMENTS 5,099,495 3/1992 Mikoshiba et al. ............ 375/1

OTHER PUBLICATIONS

Abramson, Norman, *Proceedings of the IEEE*, "VSAT Data Networks", vol. 78, No. 7, Jul. 1990, pp. 1267-1274.
Spread ALOHA for VSAT Networks, Norman Abramson, Technical Report B86-4b, University of Hawaii, Jun., 1986 (rev. Jan. 1987).

*Primary Examiner*—Douglas W. Olms
*Assistant Examiner*—Min Jung
*Attorney, Agent, or Firm*—Ostrolenk, Faber, Gerb & Soffen

[57] ABSTRACT

A satellite packet communication system comprising a central station and VSAT stations. The central station generates chip-rate clock pulses and transmits a series of data on timeslots of a frame to a satellite transponder, and a plurality of terminal stations. Each VSAT station receives the frame from the transponder and recovers the chip-rate clock pulses from the received frame. A pseudorandom number (PN) sequence generator, provided in the terminal station is synchronized with the recovered chip-rate clock pulses for generating bits of a PN sequence with which packetized data bits are pseudorandomly modulated and transmitted in burst form to the transponder. The central station includes a correlator which is synchronized with the central station's chip-rate clock pulses to detect correlations between the pseudorandomly modulated data bits a sequence of pseudorandom numbers corresponding to the PN sequence bits of the terminal stations.

10 Claims, 5 Drawing Sheets

SPREAD PACKET COMMUNICATION SYSTEM

BACKGROUND OF THE INVENTION

The present invention relates generally to satellite packet communications systems, and more specifically to a spread packet communication system.

The slotted and unslotted ALOHA packet communication systems are well known. In these systems, very small aperture terminal (VSAT) stations randomly transmit their data packets in burst form via a satellite transponder to a central station. A modified version of the ALOHA system is the spread ALOHA network which was proposed in 1986 by Norman Abramson and is described in "Spread ALOHA for VSAT Networks", Norman Abramson, Technical Report B86-4b, University of Hawaii, June, 1986 (rev. January/1987). According to this technique, packet data from each VSAT station are distributed or "spread" on the time domain using a coded sequence of pseudorandom numbers in order to reduce the probability of burst collisions and to reduce per-bit transmission power. Two spread modes are known. One is the bit spread ALOHA in which each data bit is spread into a plurality of pseudorandom code bits, and the other is the chip spread ALOHA in which each pseudorandom code bit (or chip) is spread with the data bits of a packet. No implementations of the proposed spread ALOHA system have yet been made due to anticipated hardware complexities of central station's demodulator system which must be synchronized with high-speed chip-rate clock pulses to detect correlations between received data bits and a pseudorandom number (PN) sequence.

SUMMARY OF THE INVENTION

It is therefore an object of the present invention to provide a spread packet communications system which simplifies the hardware of its central station equipment.

According to a broader aspect, there is provided a satellite packet communication system comprising a central station which generates chip-rate clock pulses and transmits a series of data on timeslots of a frame to a satellite transponder, and a plurality of terminal stations. Each terminal station receives the frame from the transponder and recovers the chip-rate clock pulses from the received frame. The terminal station includes a pseudorandom number (PN) sequence generator synchronized with the recovered chip-rate clock pulses for generating bits of a PN sequence with which packetized data bits are pseudorandomly modulated and transmitted in burst form to the transponder. The central station includes a correlator which is synchronized with the central station's chip-rate clock pulses to detect correlations between the pseudorandomly modulated data bits and a sequence of pseudorandom numbers corresponding to the PN sequence bits of the terminal stations.

The hardware simplification for bit spread packets is obtained by recovering the chip-rate clock pulses from the data rate of a received frame signal in each terminal station. Specifically, the central station of a bit spread packet communication system generates chip-rate clock pulses, derives data-rate clock pulses from the chip-rate clock pulses, and transmits a series of data in synchronism with the data-rate clock pulses on timeslots of a frame to a satellite transponder. Each terminal station includes a data-rate clock recovery circuit which recovers data-rate clock pulses from the frame signal received from the transponder and a chip-rate clock recovery circuit for recovering chip-rate clock pulses from the recovered data-rate clock pulses for synchronizing the pseudorandom number (PN) sequence generator.

In order to compensate for different round-trip propagation delay times among the terminal stations, the central station receives its own frame signal from the transponder and recovers the data-rate clock pulses from the received frame. A first chip-rate clock recovery circuit recovers chip-rate clock pulses from the recovered data-rate clock pulses and a second chip-rate clock recovery circuit is provided for recovering chip-rate clock pulses from an output signal of the correlator. A phase detector is connected to the first and second chip-rate clock recovery circuits for detecting a phase difference between their output signals and a signal indicating the detected phase difference is transmitted on a timeslot to the transponder. Each terminal station receives the phase-difference signal on an assigned timeslot and controls the phase timing of the chip-rate clock pulses which are supplied to the PN sequence generator according to the phase-difference signal..

In order to minimize the interference caused by burst collisions, each terminal station recirculates the PN sequence generator by k bits, where k is in the range between 1 and m−1, where m is the number of bits in the PN sequence. Packetized data bits from each terminal station are synchronized with the recovered data-bit clock pulses. The central station's correlator includes 2×m multipliers which are divided into first and second groups, the multipliers of each group having m pseudorandom numbers. The k value of each terminal station differs from the k value of the other terminal stations.

The hardware simplification for chip spread packets is obtained by recovering chip-rate clock pulses from the start timing of a received frame signal at each terminal station. Specifically, the central station generates chip-rate clock pulses corresponding to timeslots of a frame and transmitting a series of data on the timeslots to a satellite transponder. Each terminal station receives the frame from the transponder, detects the start timing of the received frame and recovers the chip-rate clock pulses from the detected frame start timing for synchronizing the PN sequence generator.

BRIEF DESCRIPTION OF THE DRAWINGS

The present invention will be described in further detail with reference to the accompanying drawings, in which.

DETAILED DESCRIPTION

Figure 1:
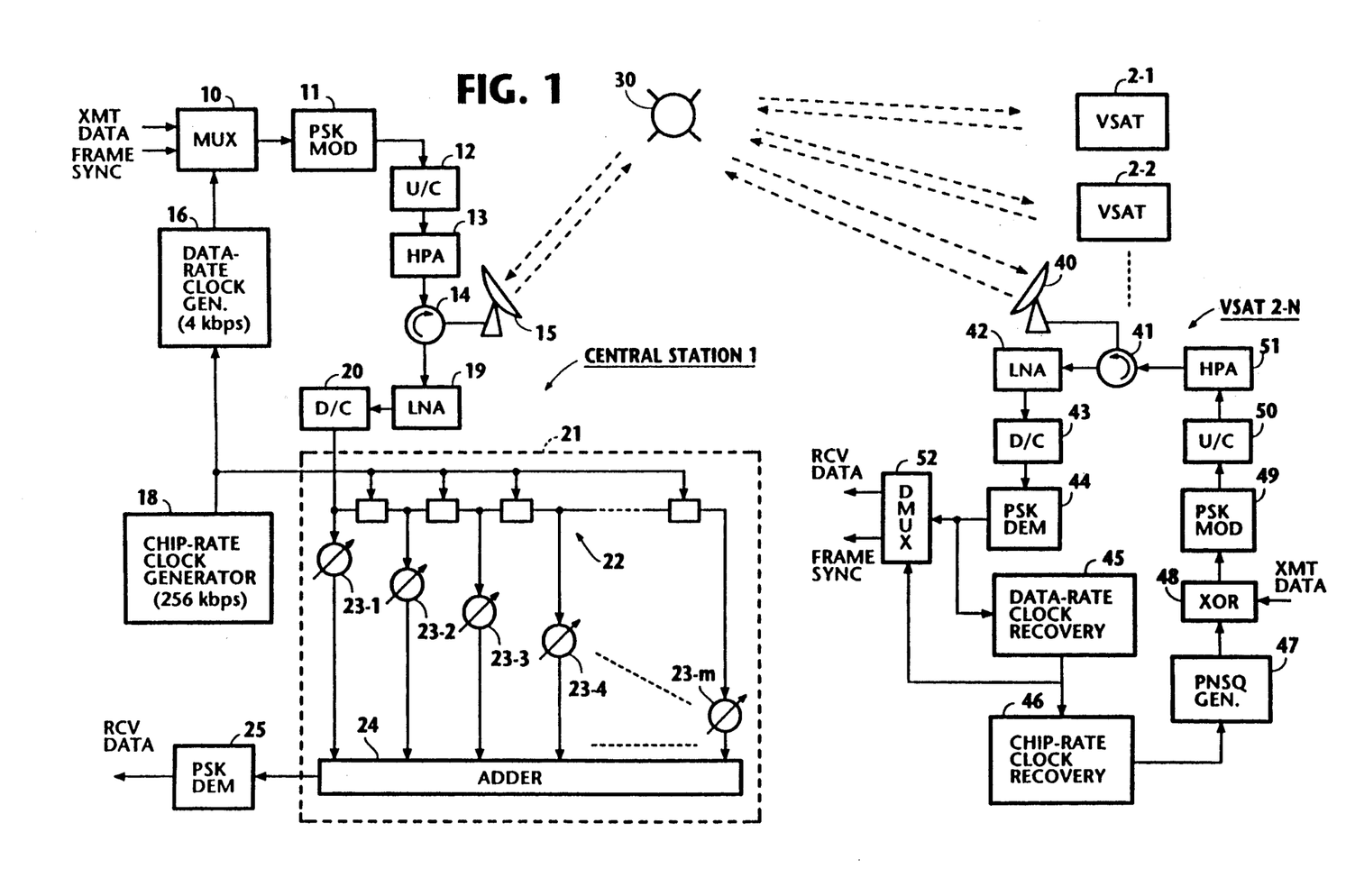
FIG. 1 is a block diagram of a bit spread ALOHA satellite communication system according to a first embodiment of the present invention.

Referring now to FIG. 1, there is shown a spread ALOHA satellite communication system according to one embodiment of the present invention. The system comprises a central station 1 and a plurality of VSAT (very small aperture terminal) stations 2-1 through 2-N interconnected with the central station via a satellite transponder 30.

Central station 1 comprises a chip-rate clock generator 18 which supplies 256-kbps chip-rate clock pulses to a data-rate clock generator 16. Data-rate clock generator 16 divides the frequency of the chip-rate clock pulses by a factor 64 and supplies a 4-kbps data-rate clock pulse to a multiplexer 10 in which 4-kbps transmit data is multiplexed with frame sync codes. The multiplexed signal is applied to an M-ary PSK (phase-shift keyed) modulator 11 where it is digitally modulated upon a carrier. The output of PSK modulator 11 is coupled to an up-converter 12 in which the PSK-modulated signal is translated to a satellite's up-link frequency and passed through a high-power amplifier 13 and a diplexer 14 to the central station antenna 15 for transmission to the satellite transponder 30.

A signal from each VSAT station is transmitted in burst (packet) form to transponder 30 and received at the central station by antenna 15 and applied through diplexer 14 and a low-noise amplifier 19 to a down-converter 20 where it is translated to a baseband frequency and applied to a correlator 21. Correlator 21 includes a tapped delay line 22 which is clocked by the chip-rate clock generator 18 to successively shift the PSK-modulated bit stream at the chip rate of 256 kbps. Successive taps of the delay line 22 are coupled respectively to multipliers 23-1 through 23-$m$ which are respectively set to different values (+1 and -1) corresponding to the bits of a pseudorandom sequence with which the original packet data bits of each VSAT station have been modulo-2 summed, or "spread". The outputs of multipliers 23 are summed by an adder 24 for coupling to a PSK demodulator 25.

The frame signal from central station 1 is retransmitted from transponder 30 in a broadcast mode to all VSATs. Each VSAT receives the broadcast signal by antenna 40 and applies it through a diplexer 41 and a low-noise amplifier 42 to a down-converter 43 in which it is translated to a baseband frequency. The output of down-converter 43 is coupled to a PSK demodulator 44 to which a data-rate clock recovery circuit 45 is coupled to recover the data-rate clock pulse. The recovered data-rate clock is applied to a demultiplexer 52 to demultiplex the output of PSK demodulator into frame sync and data inserted on the timeslot assigned to the VSAT station. The output of data-rate clock recovery circuit 45 is applied to a chip-rate clock recovery circuit 46 which recovers the original 256-kbps chip-rate clock by multiplying the recovered data-rate clock frequency by a factor of 64.

The output of chip-rate clock recovery circuit 46 is applied to a pseudorandom number (PN) sequence generator 47 to drive it at the chip-rate to produce a m-bit pseudorandom number sequence as specified for all VSATs of the satellite communication system. The output of PN sequence generator 47 is applied to one input of an exclusive-OR gate 48. Transmit packet data is applied to the other input of exclusive-OR gate 48 in which each data bit is modulo-2 summed with the PN sequence.

Figure 2:
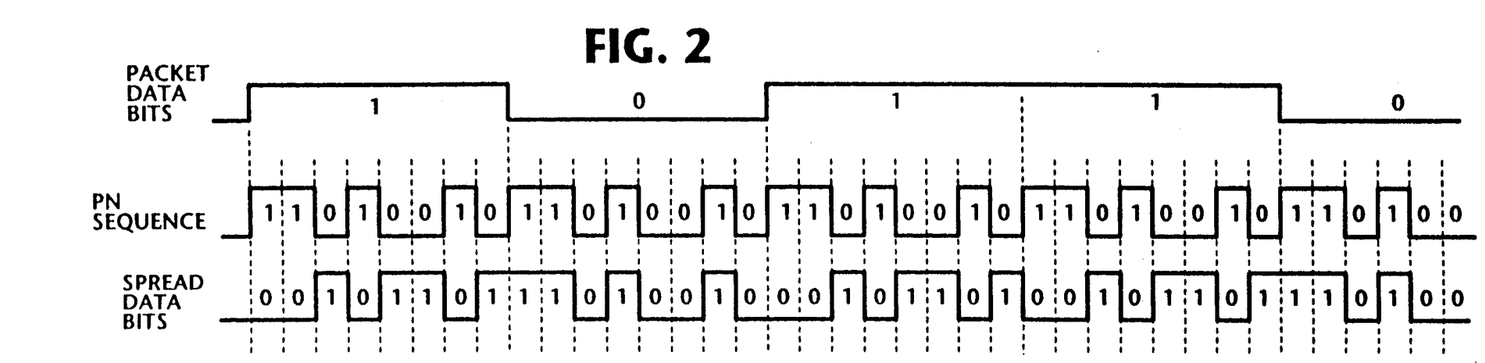
FIG. 2 is a waveform diagram associated with FIG. 1.

As illustrated schematically in FIG. 2, a portion of the packet data which is represented by a series of "10110" bits is modulo-2 summed with a PN sequence which is, for purposes of simplicity, shown as a sequence of "11010010" at a chip-clock rate eight times higher than the data bit rate. As a result of the modulo-2 summation, each data bit "1" of a packet is converted to a sequence of reversals of the 8-bit PN sequence and each data bit "0" is converted to a bit sequence having the same bit pattern as the 8-bit PN sequence.

The spread bit stream is applied to a PSK modulator 49 where it is used to modulate a burst carrier, the modulated burst carrier being translated to an up-link frequency by an up-converter 50. After high-power amplification by amplifier 51, the up-link signal of the VSAT station is applied through diplexer 41 to antenna 40 for transmission to central station 1 via transponder 30.

At the central station, the PSK-modulated carrier burst appears at the down-converter 20 and is entered into correlator 21 in which it is shifted at the chip-rate along the tapped delay line 22 successively multiplied by multipliers 23-1 through 23-$m$ with the aforesaid pseudorandom values and the outputs of multipliers 23 are summed altogether by adder 24. Adder 24 produces a positive peak value corresponding to an original binary-1 data bit or a negative peak value corresponding to an original binary-0 data bit either when there is a match between the m-bit pattern of the bit-spread PSK-modulated signal and the bit pattern of the multipliers 23. Such peak values periodically occur at the data rate of 4 kbps and are demodulated ino the original packet data by PSK demodulator 25.

Since the chip-rate clock of each VSAT is synchronized with the 256-kbps reference clock of the central station, the bit-spread packet data from all VSAT stations are synchronized with the reference clock. Because of this synchronization, correlation 21 is able to detect the original data bit stream of each packet synchronously with the common chip-rate clock, thus eliminating the need for a high-speed chip-rate clock generator and complex hardware which would otherwise be required for quickly establishing synchronism with each incoming burst.

Since the VSAT stations are located in different places, their round-trip propagation delays differ from each other to such a degree that a phase difference of less than one chip-clock interval occurs among the packets arriving at the central station.

Figure 3:
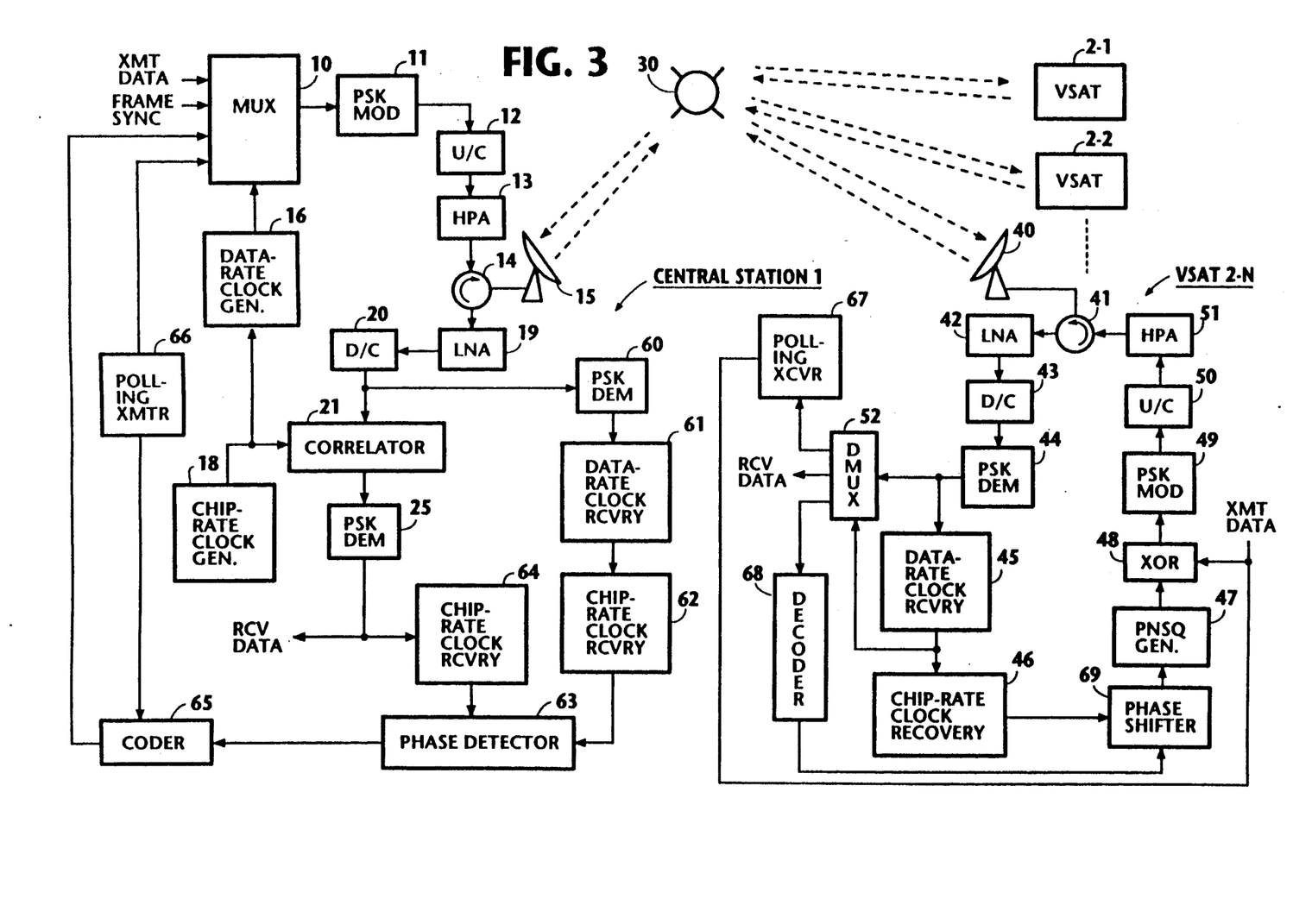
FIG. 3 is a block diagram of a bit spread ALOHA satellite communication system according to a second embodiment of the present invention.

The embodiment of FIG. 3 eliminates the phase difference problem. The central station is provided with a polling circuit 66 which periodically sends a polling signal via transponder 30 to each VSAT station to elicit a response therefrom. A PSK demodulator 60 is connected to the output of down-converter 20 to receive and demodulate the central station's polling signal returning from transponder 30 and supplies it to a clock recovery circuit 61 where the data-rate clock component of the returning signal is detected and fed into a chip-rate clock recovery circuit 62. The latter recovers the chip-rate clock timing and applies it to a phase detector 63 as a reference phase. Another chip-rate clock recovery circuit 64 is connected to the output of PSK demodulator 25 to recover the chip-rate clock timing from a response signal sent from the polled VSAT station. The output of the chip-rate clock recovery circuit 64 is applied to phase detector 63 for comparison with the reference phase. Phase detector 63 generates a phase difference signal which corresponds to the deviation of the round-trip propagation delay of that given VSAT from that of the central station. A coded signal representing the detected phase difference is generated by a coder 65. By receiving a signal from polling circuit 66 identifying the polled VSAT, coder 65 supplies the coded phase-difference signal to multiplexer 10 so that it is transmitted on the timeslot assigned to the polled station.

Each VSAT station is provided with a polling transceiver 67 and a decoder 68 both connected to demultiplexer 52. The polling signal from the central station is fed into polling transceiver 67. On receiving it, transceiver 67 applies a response signal to exclusive-OR gate 48 to cause it to be spread with the PN sequence for transmission to the central station. On the other hand, the coded phase-difference signal from the central station is demultiplexed and supplied to the decoder 68 of the polled VSAT station. A phase shifter 69 is connected between the output of chip-rate clock recovery circuit 46 and PN sequence generator 47. Phase shifter 69 receives the output of decoder 68 to introduce a delay to the chip-rate clock pulses by an amount corresponding to the round-trip propagation delay time difference of the own VSAT station with respect to the reference timing. Therefore, the chip-rate clock pulses of all VSAT stations are individually controlled at periodic intervals to compensate for their chip-rate phase timing differences.

Figure 4:
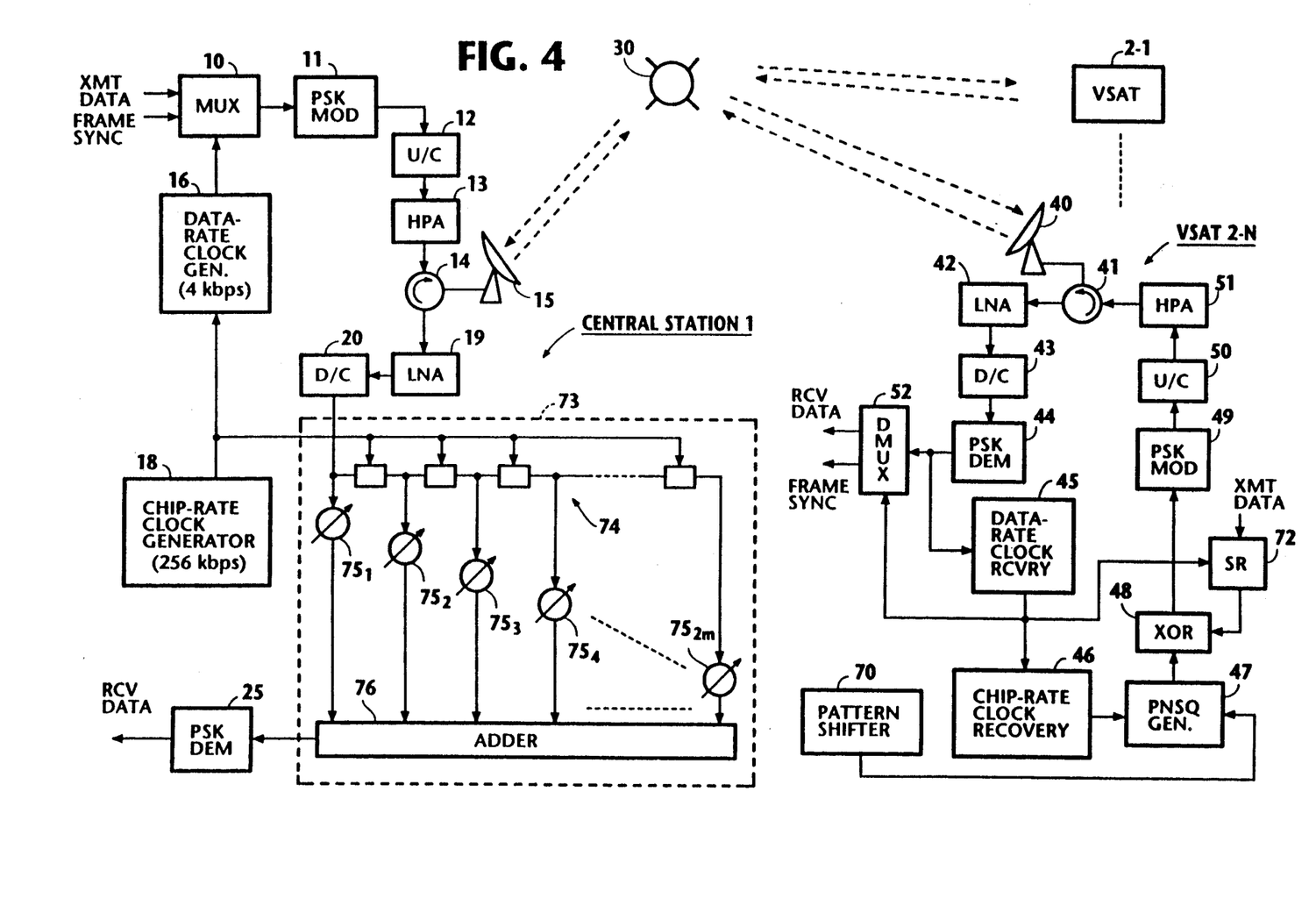
FIG. 4 is a block diagram of a bit spread ALOHA satellite communication system according to a third embodiment of the present invention.
Figure 5A:
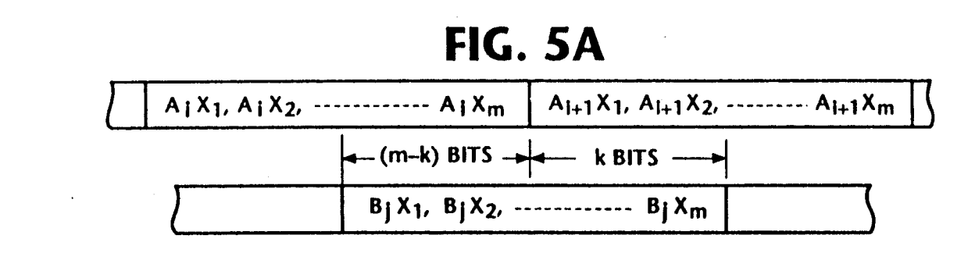
FIGS. 5A and 5B are illustrations of colliding data bit streams associated with FIG. 4.

FIG. 4 shows a third embodiment of this invention. Before describing this embodiment, it is appropriate to describe the tolerant nature of the spread ALOHA system to interference when two packets are simultaneously transmitted from VSAT stations of different systems. Assume that VSAT station 72-1 sends a sequence of data bits $A_i$ (where $i = 1, 2, 3 \ldots$) and VSAT station 73-1 transmits data bits $B_i$. The data bit of each VSAT station is spread with a pseudorandom bit sequence $X_1, X_2, \ldots X_m$ so that their transmitted sequences are represented by $A_iX_1, A_iX_2, \ldots A_iX_m$ and $B_jX_1, B_jX_2, \ldots B_jX_m$. It is further assumed that there is a collision between these spread bit sequence such that the sequence $A_iX_1, A_iX_2, \ldots A_iX_m$ overlaps $(m-k)$ bits of the sequence $B_jX_1, B_jX_2, \ldots B_jX_m$ and $k$ bits of the next sequence $B_{j+1}X_1, B_{j+1}X_2, \ldots B_{j+1}X_m$ as shown in FIG. 5A (where $k$ is the range between 1 and $m-1$). Since the correlator of central station 71-1 is synchronized with the bit sequence $A_iX_1, A_iX_2, \ldots A_iX_m$, the following correlation output is generator by the correlator:

$$y(t) = \sum_{i=1}^{m} (A_iX_i)X_i + \quad (1)$$

$$\left\{ \sum_{i=1}^{m-k} (B_jX_{i+k})X_i + \sum_{i=m-k+1}^{m} (B_{j+1}X_{i-m+k})X_i \right\}$$

The first term of Equation (1) corresponds to the component that is wanted and the second term corresponds to the component generated as a result of the interference. If the autocorrelation coefficient of the PN sequence X at delay time "i" is represented by $C_i$, the latter is at a peak value if $i=0$ and is much smaller than the peak value if $i \neq 0$. For example, if the X sequence is a maximum length sequence, $C_i = m$ for $i = 0$ and $|C_i| = 1$ for $i \neq 0$. By rearranging Equation (1) using the notation $C_i$, the following Equations yield if $B_j = B_{j+1}$:

$$y(t) = A_iC_0 + B_jC_k \quad (2)$$

and if $B_j \neq B_{j+1}$:

$$y(t) = A_iC_0 + B_j\left( \sum_{i=1}^{m-k} X_{i+k}X_i - \sum_{i=m-k+1}^{m} X_{i-m+k}X_i \right) \quad (3)$$

The second term of Equation (2) is significantly smaller than the first term of Equation (1), and therefore the data bit sequence $A_i$ can be correctly received. However, the second term of Equation (3) cannot be minimized.

In order to minimize the second term of Equation (3), each VSAT station is provided with a pattern shifter 70 which supplies a control signal to PS sequence generator 47 for periodically and/or randomly recirculating its m-bit PN sequence by k bits. For example, if one VSAT station has the PN sequence of FIG. 2 (i.e., "11010010"), the PN sequence of another VSAT station is recirculated as as sequence "10100101". A shift register 72 is connected to the data input of exclusive-OR gate 48 to store transmit packet data and forward it to exclusive-OR 48 in response to the output of data-rate clock recovery circuit 45. In this way, the transmit data bit timing of each VSAT station is synchronized with the other VSAT stations.

The central station is provided with a correlator 73 having a tapped delay line 74 with twice as many delay units as those of the tapped delay line of the previous embodiments. Likewise, twice as many multipliers $75_1$ through $75_{2m}$ are provided as those of correlator 21 of the previous embodiments. Multipliers $75_1$ through $75_{2m}$ are equally divided into a first group of multipliers $75_1$ to $75_m$ and a second group of multipliers $75_{m+1}$ to $75_{2m}$ and the multipliers of each group are set with the same PN sequence $X_1, X_2, \ldots X_m$.

Figure 5B:
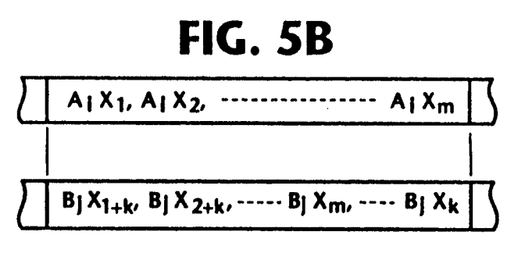

Assume that there is a collision between the bit sequence $A_iX_1, A_iX_2, \ldots A_iX_m$ from VSAT 2-1 and a bit sequence $B_jX_{1+k}, B_jX_{2+k}, \ldots B_jX_m, \ldots B_jX_k$ from VSAT 2-2. Since the bit sequence $B_j$ is displaced by k bits with respect to the bit sequence $A_i$, and the data bit timing of both packets is aligned with each other as shown in FIG. 5B, bit sequence $A_i$ matches its PN sequence which is set to multipliers $75_1$ to $75_m$. Correlator 73 produces an output signal $z(t)$ from adder 76 for the bit sequence $A_i$ which is given as follows:

$$z(t) = \sum_{i=1}^{m} (A_iX_i)X_i + \left\{ \sum_{i=1}^{m-k} (B_jX_{i+k})X_i + \sum_{i=m-k+1}^{m} (B_{j+1}X_{i-m+k})X_i \right\} \quad (4)$$

$$= A_iC_0 + B_jC_k$$

Since $z(t)$ is equal to $y(t)$ of Equation (2), the interference caused by colliding packets can be held to a minimum and the bit sequence $A_i$ can be correctly received. Following the detection of bit sequence $A_i$, bit sequence $B_j$ matches its PN sequence which is set to multipliers $75_{1+k}$ to $75_{m+k}$.

Figure 6:
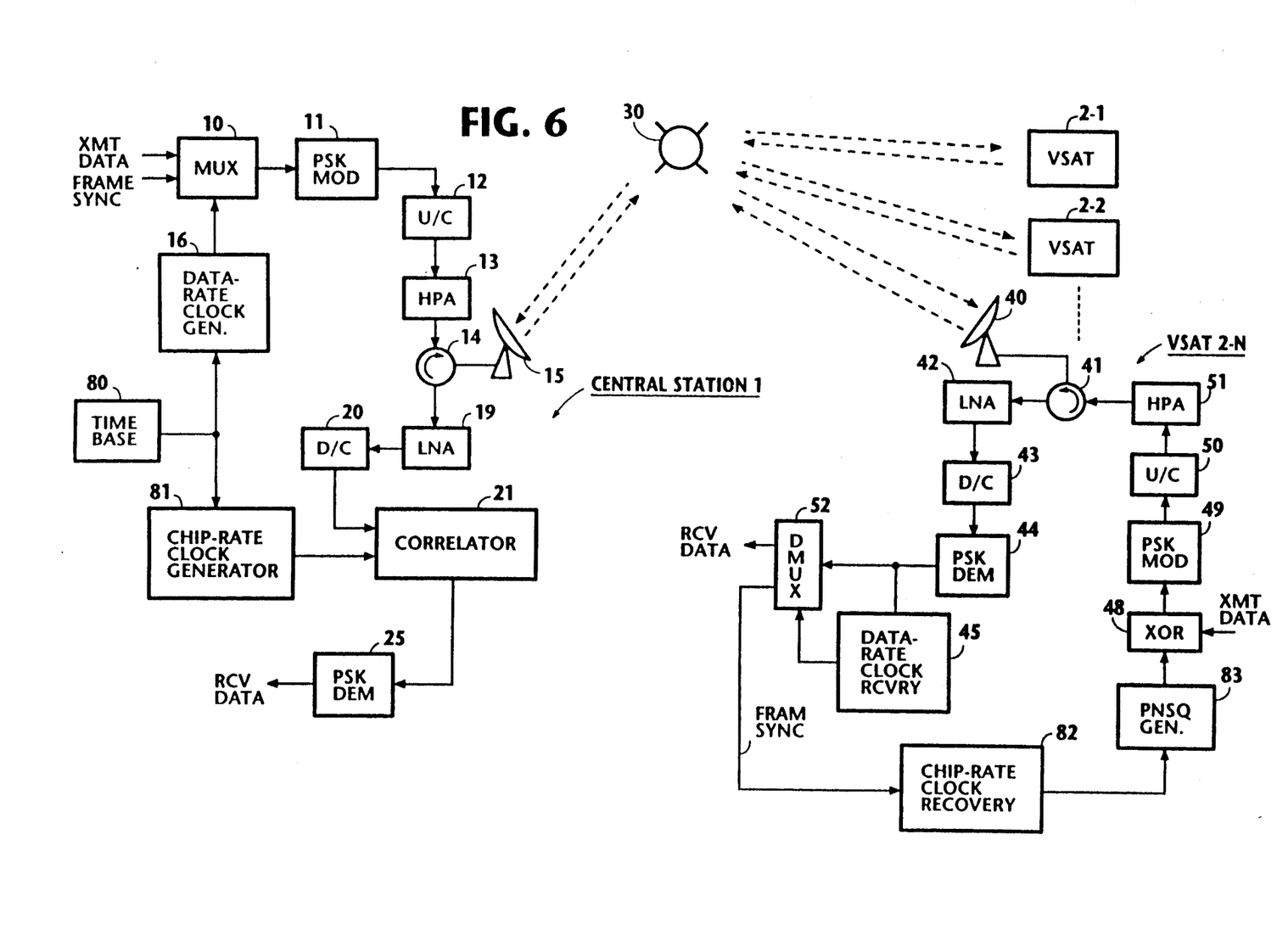
FIG. 6 is a block diagram of a chip spread ALOHA satellite communication system of the present invention.

While mention has been made of embodiments in which each data bit is spread with an m-bit PN sequence whose clock rate is higher than the data clock rate, the present invention could equally be as well employed for applications in which the binary levels of the whole data bits of each packet are randomly reversed or not depending on the binary level of each bit of a spreading PN bit sequence using a chip-clock rate lower than the data-rate clock. As illustrated in FIG. 6, the central station is provided with a time base 80 to supply reference clock pulses to a chip-rate clock generator 81 as well as to data-rate clock generator 16. Chip-rate clock generator 81 converts the frequency of the reference clock to a lower frequency corresponding to the slot timing of the frame signal and causes correlator 21 to be synchronized with the time-slot frequency.

Figure 7:
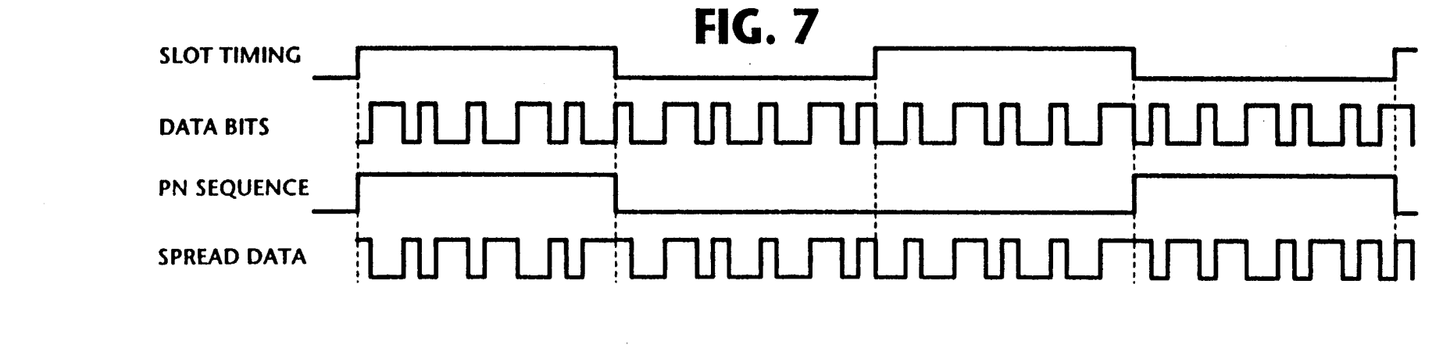
FIG. 7 is a waveform diagram associated with FIG. 6.

On the other hand, each VSAT station has a chip-rate clock recovery circuit 82 which receives frame sync from demultiplexer 52 to recover the original chip-rate clock for driving a PN sequence generator 83 at the chip-rate, i.e., the time-slot frequency. The PN sequence is a maximum length sequence with a period covering a plurality of time slots. FIG. 7 shows only a portion of the PN sequence. This PN sequence is modulo-2 summed by exclusive-OR gate 48 with transmit data bits to produce packet-spread data bits as shown in FIG. 7.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A satellite packet communication system comprising:

a central station including means for generating chip-rate clock pulses and up-converter means for transmitting a series of data on timeslots of a frame to a satellite transponder, said data being synchronized with said chip-rate clock pulses; and a plurality of terminal stations each comprising:
    (i) down-converter means for receiving said frame from said transponder;
    (ii) chip-rate clock recovery means for recovering the chip-rate clock pulses from the received frame;
    (iii) a pseudorandom number (PN) sequence generator synchronized with said recovered chip-rate clock pulses for generating bits of a PN sequence;
    (iv) pseudorandom modulator means connected to said PN sequence generator for pseudorandomly modulating packetized data bits with said PN sequence bits;
    (v) digital modulator means connected to said pseudorandom modulator for modulating the pseudorandomly modulated packetized data bits upon a burst carrier to produce a modulated carrier burst; and
    (vi) an up-converter for transmitting the modulated carrier burst to said transponder, said central station further comprising a down-converter for receiving the carrier burst of each terminal station via said transponder, correlator means connected to said down-converter and synchronized with the central station's chip-rate clock pulses for detecting correlations between pseudorandomly modulated data bits of the received carrier burst and a sequence of pseudorandom numbers corresponding to said PN sequence of the terminal stations, and digital demodulator means connected to said correlator means for demodulating the detected correlations to generate a replica of packetized data bits of each of said terminal stations.

2. A satellite packet communication system comprising:

a central station including means for generating chip-rate clock pulses and deriving data-rate clock pulses from the chip-rate clock pulses, and up-converter means for transmitting a series of data in synchronism with said data-rate clock pulses on timeslots of a frame to a satellite transponder, said chip-rate clock pulses having a frequency higher than the frequency of said data-rate clock pulses; and a plurality of terminal stations each comprising:
    (i) down-converter means for receiving said frame from said transponder;
    (ii) date rate clock recovery means for detecting data in a timeslot of the received frame and recovering therefrom the data-rate clock pulses;
    (iii) chip-rate clock recovery means for recovering the chip-rate clock pulses from the recovered data-rate clock pulses;
    (iv) a pseudorandom number (PN) sequence generator synchronized with said recovered chip-rate clock pulses for generating bits of a PN sequence;
    (v) pseudorandom modulator means connected to said PN sequence generator for pseudorandomly modulating packetized data bits with said PN sequence bits;
    (vi) digital modulator means connected to said pseudorandom modulator for modulating the pseudorandomly modulated packetized data bits upon a burst carrier to produce a modulated carrier burst; and
    (vii) an up-converter for transmitting the modulated carrier burst to said transponder, said central station further comprising a down-converter for receiving the carrier burst of each terminal station from said transponder, correlator means connected to said down-converter and synchronized with the central station's chip-rate clock pulses for detecting correlations between pseudorandomly modulated data bits of the received carrier burst and a sequence of pseudorandom numbers corresponding to said PN sequence of the terminal stations, and digital demodulator means connected to said correlator means for demodulating the detected correlations to generate a replica of packetized data bits of each of said terminal stations.

3. A satellite packet communication system as claimed in claim 2, wherein said central station comprises:

data-rate clock recovery means for receiving the frame which is transmitted from the central station and is returning from said transponder and recovering the data-rate clock pulses from the received frame;

first chip-rate clock recovery means for recovering the chip-rate clock pulses from the recovered data-rate clock pulses;

second chip-rate clock recovery means for recovering the chip rate clock pulses from an output signal of said correlator means;

means for detecting a phase difference between the chip-rate clock pulses recovered by said first chip-rate clock recovery means and the chip-rate clock pulses recovered by said second chip-rate clock recovery means and transmitting a signal representative of the detected phase difference on a timeslot to said transponder, wherein each of said terminal stations comprising:

means for receiving said phase-difference signal on an assigned timeslot and controlling phase timing of the chip-rate clock pulses supplied to said PN sequence generator according to said phase-difference signal.

4. A satellite packet communication system as claimed in claim 3, wherein said central station further comprises polling transmitter means for periodically transmitting a polling signal to each of said terminal stations via said transponder, and wherein each of said terminal stations comprises polling transceiver means for receiving the polling signal addressed to the terminal station and applying a return signal to said pseudorandomly modulating means for transmission to said central station as a response to said addressed polling signal, wherein the data-rate clock recovery means of said central station receives said polling signal returning from said transponder to derive said data-rate clock pulses therefrom.

5. A satellite packet communication system as claimed in claim 2, wherein said correlator means comprises:

a tapped delay line;

a plurality of multipliers respectively coupled to successive taps of said tapped delay line, said multipliers respectively having said pseudorandom numbers; and an adder for summing the outputs of said multipliers.

6. A satellite packet communication system as claimed in claim 2, wherein the PN sequence of each terminal station is an m-bit sequence, and each terminal station provides the burst transmission on a random basis and further comprises:

means for recirculating the PN sequence generator by k bits, where k is in the range between 1 and m−1 and the integer k is unique to each of the terminal stations; and means for causing said transmitted packetized data bits to synchronize with said recovered data-bit clock pulses, wherein said correlator means of the central station includes:

a tapped delay line clocked with the chip-rate clock pulse of the central station for receiving an output signal of said down-converter means;

2×m multipliers respectively coupled to successive taps of said tapped delay line, said multipliers being divided into a first group of m pseudorandom numbers and a second group of m pseudorandom numbers; and an adder for summing output signals of said 2 ×m multipliers to produce a summed output as said correlations.

7. A satellite packet communication system comprising:

a central station including means for generating chip-rate clock pulses corresponding to timeslots of a frame and up-converter means for transmitting a series of data on said timeslots to a satellite transponder, said chip-rate clock pulses having a bit rate lower than the bit rate of said data; and a plurality of terminal stations each comprising:

(i) down-converter means for receiving said frame from said transponder;

(ii) chip-rate clock recovery means for detecting start timing of the received frame and, in response thereto, recovering the chip-rate clock pulses;

(iii) a pseudorandom number (PN) sequence generator synchronized with said recovered chip-rate clock pulses for generating bits of a PN sequence;

(iv) pseudorandom modulator means connected to said PN sequence generator for pseudorandomly modulating packetized data bits with said PN sequence bits;

(v) digital modulator means connected to said pseudorandom modulator for modulating the pseudorandomly modulated packetized data bits upon a burst carrier to produce a modulated carrier burst; and (vi) an up-converter for transmitting the modulated carrier burst to said transponder, said central station further comprising a down-converter for receiving the carrier burst of each terminal station from said transponder; correlator means connected to said down-converter and synchronized with the central station's chip-rate clock pulses for detecting correlations between pseudorandomly modulated data bits of the received carrier burst and a sequence of pseudorandom numbers corresponding to said PN sequence of the terminal stations; and digital demodulator means connected to said correlator means for demodulating the detected correlations to generate a replica of packetized data bits for each of said terminal stations.

8. A satellite packet communication system comprising:

a central station including means for generating chip-rate clock pulses and up-converter means for transmitting a series of data on timeslots of a frame to a satellite transponder, said data being synchronized with said chip-rate clock pulses; and a plurality of terminal stations each comprising:

(i) down-converter means for receiving said frame from said transponder;

(ii) chip-rate clock recovery means for recovering the chip-rate clock pulses from the received frame;

(iii) a pseudorandom number (PN) sequence generator synchronized with said recovered chip-rate clock pulses for generating bits of a PN sequence;

(iv) pseudorandom modulator means connected to said PN sequence generator for pseudorandomly modulating packetized data bits with said PN sequence bits; and (v) up-converter means for transmitting the pseudorandomly modulated data bits on a carrier burst to said central station via said transponder;

said central station further comprising down-converter means for receiving a carrier burst of each terminal station via said transponder, and correlator means for detecting correlations between pseudorandomly modulated data bits of the received carrier burst and a sequence of pseudorandom numbers corresponding to said PN sequence of the terminal stations, said correlator means comprising:

a tapped delay line clocked with the central station's chip-rate clock pulses for receiving an output of the down-converter means;

a plurality of multipliers connected respectively to successive taps of said tapped delay line, said multipliers having said pseudorandom numbers of the terminal stations; and an adder for summing the outputs of said multipliers.

9. A satellite packet communication system comprising:

a central station including means for generating chip-rate clock pulses and deriving data-rate clock pulses from the chip-rate clock pulses, and up-converter means for transmitting a series of data in synchronism with said data-rate clock pulses on timeslots of a frame to a satellite transponder, said chip-rate clock pulses having a bit rate higher than the bit rate of said data-rate clock pulses; and a plurality of terminal stations each comprising:
  (i) down converter means for receiving said frame from said transponder;
  (ii) data-rate clock recovery means for detecting data in a timeslot of the received frame and recovering therefrom the data-rate clock pulses;
  (iii) chip-rate clock recovery means for recovering the chip-rate clock pulses from the recovered data-rate clock pulses;
  (iv) a pseudorandom number (PN) sequence generator synchronized with said recovered chip-rate clock pulses for generating bits of PN sequence;
  (v) pseudorandom modulator means connected to said PN sequence generator for pseudorandomly modulating packetized data bits with said PN sequence bits; and
  (vi) up-converter means for transmitting the pseudorandomly modulated data bits on a carrier burst to said central station via said transponder;

said central station further comprising down-converter means for receiving a carrier burst of each terminal station via said transponder, correlator means synchronized with the central station's chip-rate clock pulses for detecting correlations between pseudorandomly modulated data bits of the received carrier burst and a sequence of pseudorandom numbers corresponding to said PN sequence of the terminal stations, said correlator means comprising:

a tapped delay line clocked with the central station's chip-rate clock pulses for receiving an output of the down-converter means;

a plurality of multipliers connected respectively to successive taps of said tapped delay line, said multipliers having said pseudorandom numbers of the terminal stations; and an adder for summing the outputs of said multipliers.

10. A satellite packet communication system comprising:

a central station including means for generating chip-rate clock pulses corresponding to timeslots of a frame and up-converter means for transmitting a series of data on said timeslots to a satellite transponder, said chip-rate clock pulses having a bit rate lower than the bit rate of said data; and a plurality of terminal stations each comprising:
  (i) down-converter means for receiving said frame from said transponder;
  (ii) chip-rate clock recovery means for detecting start timing of the received frame and, in response thereto, recovering the chip-rate clock pulses;
  (iii) a pseudorandom number (PN) sequence generator synchronized with said recovered chip-rate clock pulses for generating bits of a PN sequence;
  (iv) pseudorandom modulator means connected to said PN sequence generator for pseudorandomly modulating packetized data bits with said PN sequence bits; and
  (v) up-converter means for transmitting the pseudorandomly modulated data bits on a carrier burst to said central station via said transponder;

said central station further comprising down-converter means for receiving a carrier burst of each terminal station via said transponder, correlator means synchronized with the central station's chip-rate clock pulses for detecting correlations between pseudorandomly modulated data bits of the received carrier burst and a sequence of pseudorandom numbers corresponding to said PN sequence of the terminal stations, said correlator means comprising:

a tapped delay line clocked with the central station's chip-rate clock pulses for receiving an output of the down-converter means;

a plurality of multipliers connected respectively to successive taps of said tapped delay line, said multipliers having said pseudorandom numbers of the terminal stations; and an adder for summing the outputs of said multipliers.

* * * * *